Dec. 10, 1968  W. E. RUSHTON ET AL  3,415,039
METHOD AND APPARATUS FOR THE RECOVERY OF FLUORINE
Filed Nov. 3, 1965  2 Sheets-Sheet 1
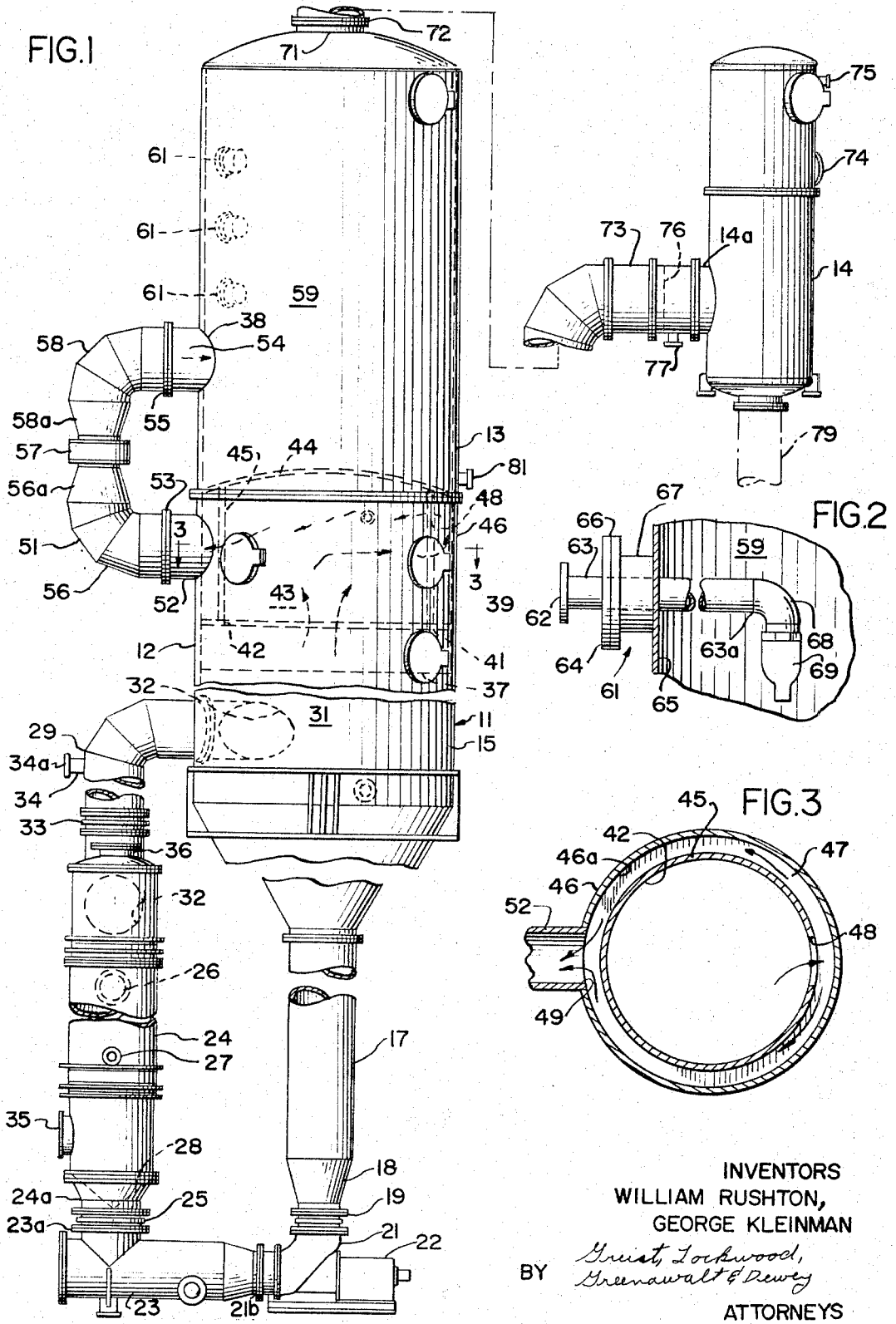
INVENTORS
WILLIAM RUSHTON,
GEORGE KLEINMAN
BY Greist, Lockwood,
Greenawalt & Dewey
ATTORNEYS Dec. 10, 1968    W. E. RUSHTON ET AL    3,415,039
METHOD AND APPARATUS FOR THE RECOVERY OF FLUORINE
Filed Nov. 3, 1965    2 Sheets-Sheet 2
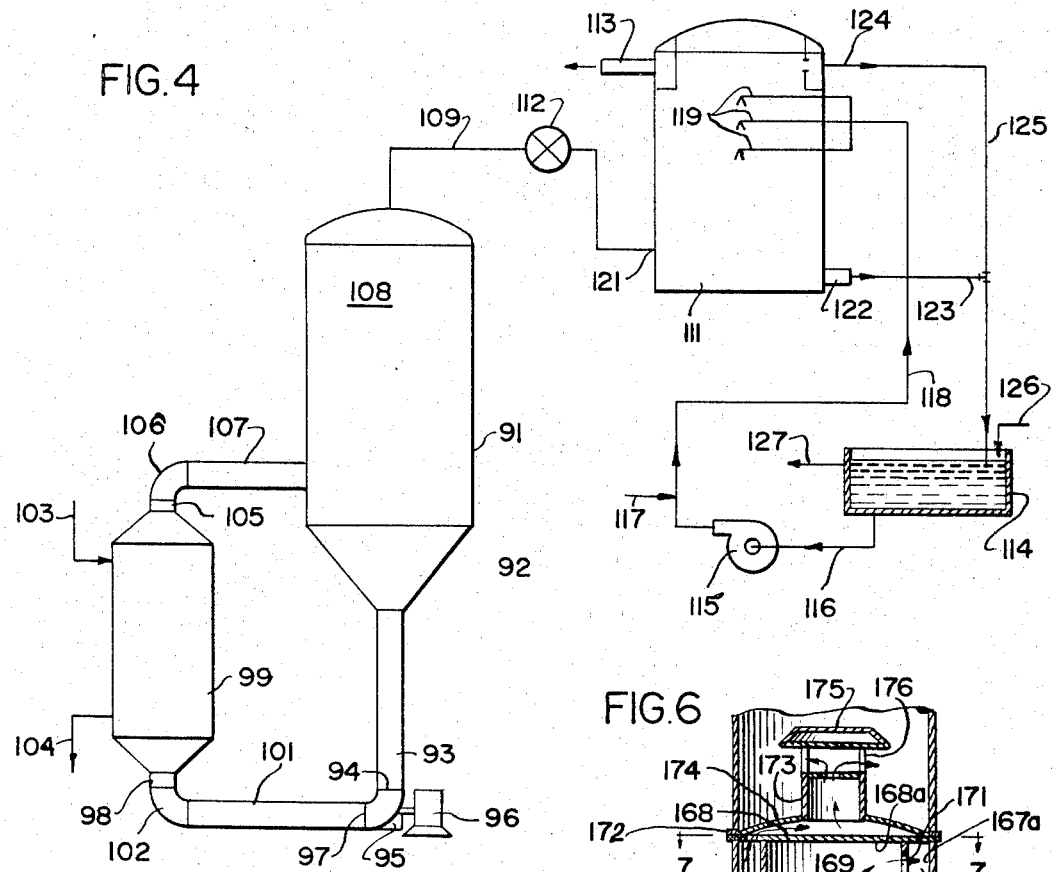
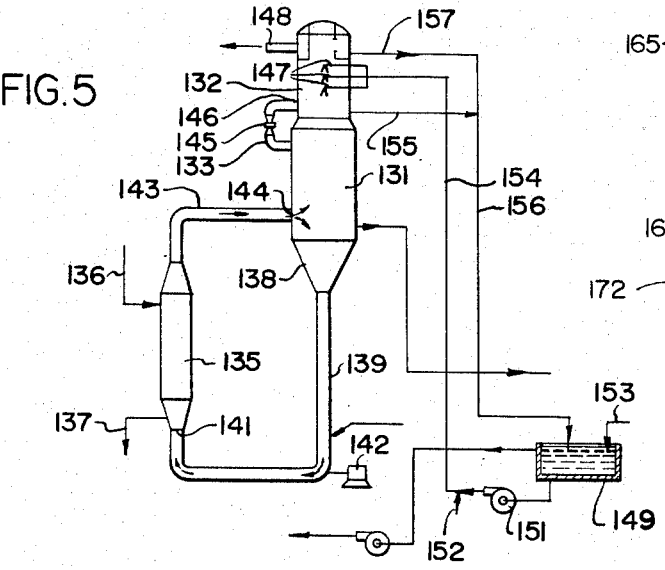
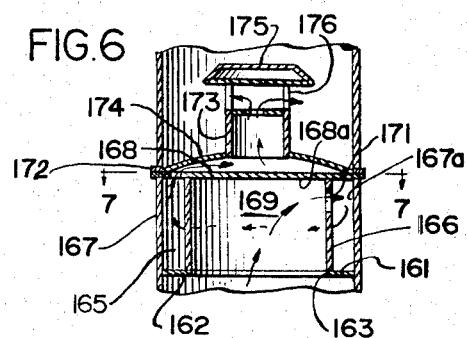
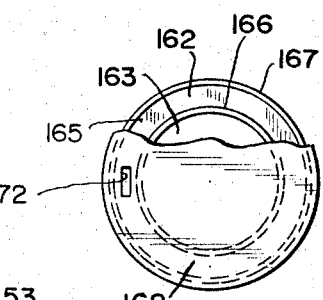
INVENTORS
WILLIAM RUSHTON,
GEORGE KLEINMAN
BY *Greist, Lockwood,
Greenawalt & Dewey*
ATTORNEYS 3,415,039
METHOD AND APPARATUS FOR THE RECOVERY
OF FLUORINE
William E. Rushton, South Holland, Ill., and George
Kleinman, Charlotte, N.C., assignors to Whiting Corporation, a corporation of Illinois
Filed Nov. 3, 1965, Ser. No. 506,235
13 Claims. (Cl. 55—51)

ABSTRACT OF THE DISCLOSURE

A method and apparatus by which fluorine compounds evolved in equilbrium concentrations from an evaporator can be recovered in increased amounts by scrubbing the vapor product from such evaporator in a scrubbing tower operated at a reduced pressure with respect to the pressure in the evaporator. For example, in an evaporator for concentrating a dilute phosphoric acid feed wherein the evaporator is operated at an absolute pressure of about 8½ inches Hg, the scrubbing tower could be operated at an absolute pressure of 2 inches Hg. Under such circumstances, the fluorine compounds evolved from the evaporator (e.g., $SiF_4$ and $HF$) are recovered with appreciably higher efficiencies at any given concentration by an aqueous fluosilicic scrubbing solution. These increased efficiencies become particularly significant in those situations wherein the scrubbing solution has a fluosilicic acid concentration of 20% or more. The pressure in the scrubber should be at least ½ inch Hg lower than in the evaporator, however, improved results are obtained where greater differential pressures are employed. As such, the present invention advantageously provides improved fluorine recovery together with substantially reduced stream and air contamination. Suitable pressure reducing devices include, for example, throttle valves and entrainment separators having high flow restriction properties.

---

The invention generally relates to improvements and innovations in method and apparatus for recovery of selective vapor constituents by scrubbing and, more specifically, concerns an improved method and apparatus for the recovery of gaseous fluorine compounds from vapors containing the same. As such, the present invention is particularly suited to the recovery of fluorine compounds present in vapors evolved during the concentrating of aqueous phosphoric acid solutions by evaporation.

In the manufacture of phosphoric acid by the wet process phosphoric acid technique, fluorine is evolved in varying amounts in the various stages of the process. The fluorine compounds present in the phosphate rock are liberated by the sulfuric acid, resulting in the following reactions taking place:

$$CaF_2 + H_2SO_4 \rightarrow CaSO_4 + 2HF \quad \text{Eq. 1}$$

$$4HF + 2SiO_2 \rightarrow SiF_4 + 2H_2O \quad \text{Eq. 2}$$

$$3SiF_4 + 2H_2O \rightarrow 2H_2SiF_6 + SiO_2 \quad \text{Eq. 3}$$

An equilibrium between the fluosilicic acid, silicon tetrafluoride and hydrofluoric acid is produced which can be generally represented as follows:

$$H_2SiF_6 \rightleftharpoons SiF_4 + 2HF \quad \text{Eq. 4}$$

These fluorine compounds ($SiF_4$ and $HF$) can be recovered from the vapor phase by scrubbing the vapors with a scrubbing solution, such as dilute fluosilicic acid solution. Convenitionally, the overhead vapors from an evaporating chamber are transmitted directly to a scrubbing tower which is in open communication therewith. A dilute aqueous fluosilicic acid scrubbing solution absorbs the gaseous $SiF_4$ and $HF$ present in the vapor, resulting in the concentration of $H_2SiF_6$ in the scrubbing solution being increased. The scrubbing solution is then returned to a sump. A portion of the solution in the sump can be removed as product with this amount being replenished by makeup water and the scrubbing solution then recycled back to the scrubbing tower.

For example, in a conventional three stage evaporator system for concentrating dilute phosphoric acid, produced by the reaction of phosphate rock with sulfuric acid, to a 54% $P_2O_5$ product the evaporating chamber in the first stage, normally operating at a pressure of around 8.56 inches of mercury absolute with a corersponding equilibrium temperature of about 155° F., is connected to a scrubbing tower operating at the same pressure. The vapors from the evaporator, containing equilibrium contrations of $SiF_4$ and $HF$ are then scrubbed with a dilute aqueous fluosilicic acid solution (around 15%–25% $H_2SiF_6$) maintained at about 155° F. Under these conditions, it has been noted that a 20% $H_2SiF_6$ product results in a fluorine loss from the scrubbing tower of approximately 0.008 pound of fluorine per pound of water vapor. Experimental data indicates that as the concentration of fluosilicic acid in the product is increased, the amount of fluorine lost is also increased. For example, if a 25% aqueous solution is to be produced, the fluorine loss will be approximately equal to 0.025 pound of fluorine per pound of water vapor. Similarly, if a 30% fluosilicic acid solution is to be produced, the fluorine loss will be approximately equal to 0.06 pound of fluorine per pound of water vapor. The consequences of this degree of fluorine loss under conventional recovery techniques becomes apparent when it is realized that in most evaporators any loss greater than 0.03 pound of fluorine per pound of water vapor exceeds the amount of fluorine evolved in the evaporating chamber in that particular stage.

Fluosilicic acid is an important byproduct in the wet process phosphoric acid process since it can be advantageously used by municipalities for the fluoridation of drinking water. In this regard, however, conventional fluorine recovery techniques, as is evidenced by the data given above, economically provide only a relatively dilute aqueous fluosilicic acid solution (i.e. around 20% $H_2SiF_6$). Fluosilicic acid solutions of higher concentrations are preferred for a number of reasons, one of which being that the more concentrated solutions substantially reduced the transportation cost per pound of $H_2SiF_6$ shipped.

Conventional fluorine recovery techniques, when used to produce aqueous fluosilicic acid solutions containing more than 20% $H_2SiF_6$ result in very high amounts of the fluorine compounds being transmitted with the water vapor from the scrubbing tower to the waste disposal system. Accordingly, conventional methods for the recovery of fluorine compounds have presented serious waste disposal problems.

The method and apparatus of the present invention provide substantially improved fluorine recovery enabling the economical production of fluosilicic acid solutions of higher concentration than can be obtained conventionally and, correspondingly result in the substantially reduced loss of fluorine compounds with the water vapor from the scrubbing tower.

In accordance with a specific embodiment of the method of the present invention, the vapor phase produced by the evaporation of an aqueous phosphoric acid solution (containing equilibrium concentrations of water vapor, HF and $H_2SiF_6$ for the particular temperature and pressure at which the evaporating chamber is operating) is transmitted to a scrubbing tower where it is scrubbed with a fluosilicic acid solution at a pressure lower than that present in the evaporating chamber. By scrubbing the vapors at a reduced pressure, the equilibrium concentrations established in the evaporating chamber are upset resulting in greater amounts of the gaseous fluorine compounds being absorbed by the fluosilicic acid scrubbing solution.

For example, in the illustration given above wherein the first stage evaporating chamber operated at an absolute pressure of 8.86 inches of mercury, operating the scrubbing tower at an absolute pressure of 2.0 inches of mercury will lower the fluorine loss to 0.002 pound of fluorine per pound of water vapor for a 20% $H_2SiF_6$ product (as compared to a loss of 0.008 pound of fluorine per pound of product when the scrubbing tower operates in accordance with conventional practices). Similarly, if a 25% $H_2SiF_6$ product were produced the fluorine loss with the scrubbing tower operating at the reduced pressure would only be approximately 0.004 pound of fluorine per pound of water vapor (compared to a loss of 0.025 pound of fluorine per pound of water vapor with the conventional arrangement). A loss of only about 0.0085 pound of fluorine per pound of water vapor would be obtained with a 30% $H_2SiF_6$ product when the techniques of the present invention are employed (compared to a loss of 0.06 pound of fluorine per pound of water vapor with conventional methods).

The improved fluorine recovery techniques of the present invention have applicability to vapor-scrubbing operations other than those involving the recovery of fluorine compounds in a wet process phosphoric acid system. Accordingly, the present invention can generally be stated to involve the recovery of a desired component from a vapor by scrubbing the vapor with a liquid adapted to absorb that desired component under reduced pressure conditions (viz where the scrubbing is done at a pressure which is lower than that present at the location at which the vapor is generated).

It is, therefore, an object of the present invention to provide a method and apparatus for the recovery of vapor phase constituents by scrubbing thereof under reduced pressure conditions adapted to enable the absorption of larger amounts of these vapor phase constitutents by the scrubbing liquid.

Another and important object of the present invention is to provide an improved method and apparatus for the recovery of fluorine compounds present in the vapor evolved in a phosphoric acid solution evaporating chamber by scrubbing said vapors at a pressure lower than that found in the evaporator chamber.

Another object of the present invention is to provide an improved method and apparatus for the production of an aqueous fluosilicic acid solution which involves scrubbing a vapor product containing equilibrium concentrations of water vapor, HF and $SiF_4$ (for a given temperature and pressure, i.e. that present in the evaporating chamber from where the vapor product is evolved) with a scrubbing liquid at a pressure below the given equilibrium pressure, thereby resulting in the absorption of greater amounts of $SiF_4$ and HF by said scrubbing liquid than can be absorbed when the scrubbing operation is accomplished at the given equilibrium conditions.

Other and further objects of the present invention will be apparent from the following detailed description of the accompanying drawings wherein:

FIGURE 1 is an elevational view, partially in section, illustrating a forced circulation evaporator, scrubbing tower and barometric condenser embodying principles of the present invention;

FIGURE 2 is an enlarged elevational view of one of the spray nozzles of the scrubbing tower illustrated in FIGURE 1;

FIGURE 3 is a horizontal sectional view taken along the line 3—3 of FIGURE 1 illustrating the vapor flow through the entrainment separator of the apparatus shown therein;

FIGURE 4 is a flow diagram illustrating one embodiment of the present invention;

FIGURE 5 is a flow diagram of another embodiment of the present invention;

FIGURE 6 is an enlarged sectional view of one form of entrainment separator which can be employed in the fluorine recovery system shown of the present invention; and FIGURE 7 is a plan sectional view taken along the line 7—7 of the entrainment separator shown in FIGURE 6.

In the embodiment of the invention illustrated in FIGURE 1, the reference numeral 11 generally designates a phosphoric acid concentrating apparatus including an evaporator 12, a scrubbing tower 13 and a barometric condenser 14.

Evaporator 12 includes a generally cylindrical body 15 having a frusto-conical bottom 16 which has an elongated vertically extending leg 17 mounted thereto. As is shown, vertical leg 17 is provided with a tapered bottom 18 connected through a suitable expansion joint 19 to the inlet end 21a of a circulating pump 21. A stuffing box 22 is interposed between pump 21 and motor (not illustrated). The discharge end 21b of circulating pump 21 opens into an elongated horizontal pipe section 23 communicating with the tube inlet 24a of heat exchanger 24. Expansion joint 25 of the same general construction as expansion joint 19 is interposed between the tube inlet end 24a and the outlet 23a of pipe section 23.

Heat exchanger 24 includes a plurality of elongated vertically extending tubes (not illustrated) which are heated by a heat transfer medium such as steam which enters through inlet 26. A condensate outlet 27 is provided adjacent the tube inlet end. If desired, a conical screen 28 (shown in phantom) can be provided at the tube inlet 24a to prevent the transmission of any solids into the heat exchanger tubes.

An outlet conduit 29 communicates with the interior 31 of evaporator 12 with the tube outlet 32, illustrated in phantom in FIGURE 1. Conduit 29 is equipped with an expansion joint 33 and a feed inlet 34 having a mounting flange 34a enabling it to be connected to a dilute phosphoric acid feed source. Access to the tube side of heat exchanger 24 is provided through manholes 35 and 36 for removing scale and other deposits therefrom which build up on the interior surfaces of the exchanger tubes.

In a typical forced circulation evaporator illustrated, the static head provided by the liquid phosphoric acid in the heat exchanger tubes and conduit 29 is sufficient to prevent the vaporization of phosphoric acid until it gets to the evaporator 12. Accordingly, upon being introduced into the interior 31 of the evaporated chamber 12, the heated dilute phosphoric acid solution will immediately flash with equilibrium amounts of $SiF_4$, HF and water vapor being present in the vapor phase over the more concentrated liquid phosphoric acid which is generally indicated by the liquid level line 37 (shown in phantom).

Vapors from the evaporator 12 are transmitted to scrubbing tower 13 wherein they are sprayed or scrubbed with a scrubbing liquid which absorbs the gaseous fluorine compounds present in equilibrium concentrations with respect to the temperature and pressure conditions in the evaporating chamber 31. In accordance with the present invention, suitable pressure reducing means are interposed between the vapor inlet 38 and the interior 31 of the evaporator 12. These pressure reducing means generally comprise one or more flow restriction devices which provide a pressure drop of at least one-half inch of mercury. In this regard, an entrainment separator such as the centrifugal entrainment separator 39 can be used to effect the desired pressure drop.

As is best shown in FIGURES 1 and 3, centrifugal entrainment separator 39 includes a circular plate 41 having an outer periphery which is snugly received by the side wall surface of interior chamber 31. A centrally disposed opening 42 communicates inner chamber 31 of evaporator 12 with inner chamber 43 defined by a continuous domed plate 44 and circumferential inner wall 45. Inner wall 45 and outer wall 46 (shown to be coextensive with the cylindrical body portion 15 of the evaporator) define an annular chamber which completely encircles the inner chamber 43. As is best shown in FIGURE 3, inner wall 45 is provided with an opening 48 oppositely disposed from the annular chamber outlet 49 to which a vapor transmission line is mounted. Due to the corrosive nature of the vapor constituents in a typical phosphoric acid concentration operation, it is desirable that the entrainment separator be rubber lined. Accordingly, vapors from inner chamber 31 containing equilibrium amounts of the respective vapor constituents enter interior chamber 43 through opening 42 and from there are directed into annular chamber 47 wherein they are subjected to a centrifugal force that acts to separate the entrained liquid particles which are collected on the interior surface 46a. A suitable collection trough (not shown) returns the collected liquid to the phosphoric acid recycle stream.

The vapors are then discharged through outlet 49 into vapor transmission line 51 mounted to integral pipe section 52 by means of a flange arrangement as shown at 53. A similar integral pipe section 54 is mounted to the other end of vapor transmission line 51 by flange coupling 55.

As is best shown in FIGURE 1, vapor line 51 has a generally U-shaped construction which includes a pair of 90° elbow sections 56, 58 that are joined through oppositely flared tapered conduits 56a and 58a, respectively, to a suitable flow restriction device 57 which, in the illustrated embodiment, is a butterfly valve.

In accordance with the present invention, entrainment separator 39 and flow restriction means 57 co-operate to reduce the pressure in the interior 59 of scrubbing tower 13 thereby upsetting the equilibrium vapor constituent concentrations in the vapor product from the evaporator enabling larger amounts of the gaseous flourine compounds (HF and SiF$_4$) to be absorbed by the scrubbing liquid which is directed onto the incoming vapors from plurality of nozzles 61. As is best shown in FIGURE 2, each of the nozzles includes an outer flanged inlet 62 integrally formed with a conduit 63 having a flange mounting plate 64 for securing conduit 63 to a comparably sized flanged portion 66 integrally formed with an annular spacing member 67. Conduit 63 extends through spacer 67 into the interior 59 of scrubbing tower 13. The inner end 63a of conduit 63 has a 90° elbow section 68 fixed thereto. A flow control nozzle component 69 is used to provide controlled spraying of the scrubbing liquid.

In the illustrated embodiment, the unabsorbed HF, SiF$_4$ and water vapor are discharged from scrubbing tower 13 into a barometric condenser 14. As is shown, scrubbing tower 13 includes a vapor outlet 71 having a flanged mounting plate 72 for connecting with vapor conduit 73 which communicates with vapor inlet 14a of barometric condenser 14. Condenser 14 is provided with a water inlet 74 and steam ejector connection 75. If desired, vapor line 73 can be equipped with a suitable entrainment separator shown diagrammatically at 76 and drain 77 for collecting liquid fluorine compounds entrained in the overhead vapor product and returning the compounds to the recycle scrubbing solution stream (not illustrated in FIGURES 1–3.) A barometric leg 79 connected to a suitable waste disposal arrangement is provided in accordance with conventional practices in the art.

A drain 81 located at the bottom of the scrubbing tower 13 communicates the scrubbing liquid containing the absorbed HF and SiF$_4$ to the recycle scrubbing liquid stream which is more fully described in connection with FIGURES 4 and 5.

FIGURE 4 illustrates a generally schematic flow diagram of a single stage fluorine recovery system embodying principles of the present invention. In the embodiment illustrated in this figure, the reference numeral 91 generally designates a forced circulation evaporator having a frusto-conical bottom 92 communicating with a recycle flow conduit 93 which discharges into the inlet end 94 of a pump 95 operatively connected to a motor 96. The discharge end of the pump 97 communicates with the tube inlet 98 of a heat exchanger 99 through horizontal conduit 101 and elbow 102. Steam or other heating method is introduced in countercurrent fashion through shell inlet and outlet 103 and 104, respectively. Tube outlet 105 communicates with the interior of the evaporator 91 through an elbow section 106 and horizontal conduit 107.

The liquid head in the tube outlet 105 and elbow section 106 maintains the heated liquid in the heat exchanger tubes in a non-boiling condition. Accordingly, if the fluid is discharged into the interior 108 of the evaporator 91, it will immediately flash to produce a vapor phase and fluid phase. The vapor phase contains equilibrium amounts of the particular constituents of the fluid feed. For example, in a phosphoric acid concentration operation, the vapor phase will contain equilibrium amounts of HF, SiF$_4$ and water vapor. It has been found that maintaining evaporator 91 under vacuum at an absolute pressure of between two and ten inches of mercury is desirable when the evaporator is used as the first stage in a three stage evaporating operation. In this regard, it should be noted that the apparatus shown in FIGURE 4 can be operated either separately or in series with a plurality of comparable units to provide multi-stage evaporation and recovery of vapor products.

The overhead vapors from the interior chamber of evaporator 91 are transmitted through overhead vapor line 109 into a scrubbing tower 111.

In accordance with the present invention, vapor line 109 is equipped with a suitable flow restriction means 112 for reducing the pressure in the scrubbing tower 111. In this regard, while the flow restriction means should provide a pressure drop of at least one-half inch of mercury, it should be realized that a substantially larger pressure drop will result in greater amounts of the gaseous HF and SiF$_4$ being absorbed by the scrubbing liquid with a corresponding decrease in the amount of fluorine compounds lost with overhead vapor discharged from the scrubber 111. For example, pressure drops of around 6 inches of mercury have been advantageously used to obtain the improved fluorine recovery described previously.

The flow restriction or pressure reducing means can include a throttle valve, an orifice plate or other flow restriction devices. Where substantial pressure drops are desired, a plurality of such flow restriction devices can be used in the vapor line 109.

The H$_2$SiF$_6$ stream is generally recycled from a sump 114 which is connected to a recycle pump 115 by means of a conduit 116. Downstream from recycle pump 115 makeup water can be introduced through a suitable feed inlet 117. Makeup water could also be added upstream from the pump 115. The downstream piping 118 is connected to a plurality of spraying nozzles 119 which are positioned so that they will discharge the scrubbing liquor onto the vapors which enter the scrubbing tower 111 therough an inlet 121 preferably positioned near the bottom of the tower 111 so that the vapors will rise in counter-current relationship to the flow of scrubbing liquid from the nozzles 119. As the fluorine compounds along with the water vapor are scrubbed, the scrubbing liquid absorbs the gaseous fluorine compounds and recycles it back to the sump 114 through outlet 122 and recycle pipe 123. An entrainment separator (not illustrated) for removing entrained liquid from the vapor product exiting through vapor outlet 113 discharged the collected entrained liquid through a drain 124 into the recycle line 125.

In order to minimize the amounts of water which are condensed in the scrubbing tower, it is desired to maintain the temperature of the scrubbing liquor at approximately the equilibrium temperature of the incoming vapor from the evaporator 108.

As noted previously, the apparatus shown in FIGURE 4 can be connected in series to provide multi-stage phosphoric acid concentration and corresponding fluorine recovery. In multi-stage installations, since the $SiF_4$ constituent of the vapor product has a higher vapor pressure than the HF, it has been found that there will be an excess of $SiF_4$ in the first stage scrubbing liquid and an excess of HF in the second stage scrubbing liquid. According, to prevent the precipitation of silica ($SiO_2$) in the sump 114, it is desired to have the sump from the second stage containing fluosilicic acid rich in HF, overflow from the second stage (as generally designated by the reference numeral 126) to the first stage as makeup. Makeup water is then added to the second or third stage on demand as determined by a suitable float control means positioned in the first stage sump. Product removal is through outlet 127.

Multi-stage phosphoric acid concentration units are generally connected in series with the phosphoric acid product from the first stage being introduced into the second stage as feed and the phosphoric acid product from the second stage being introduced as feed to the third stage. In these operations, it is generally preferred to have the fluorine recovery components arranged with each stage sump containing the aqueous fluosilicic acid solutions overflowing into the previous stage sump. For example, the sump from the third stage will overflow the fluosilicic acid solution as makeup to the fluosilicic acid contained in the sump in the second stage. Similarly, the fluosilicic acid contained in the second stage will overflow as makeup into the first stage. Makeup water would then be added to the third stage with the final fluosilicic acid product being withdrawn from the first stage.

FIGURE 5 represents a schematic flow diagram which constitutes another embodiment of the present invention. As is shown therein, the reference numeral 131 generally illustrates an evaporator having a scrubbing tower 132 mounted directly thereon and interconnected with said evaporator by means of a vapor line 133. Phosphoric acid being concentrated, is heated in heat exchanger 134 in countercurrent flow with steam or some other heating medium which is supplied to the heat exchanger through inlet 136 and exits therefrom through outlet 137. The phosphoric acid liquid flow (generally shown by arrows) exits through the frusto-conical bottom 138 into a bottom leg 139 from where it is pumped into the tube inlet side 141 of the heat exchanger 135 by means of a pump 142. The static head in the heat exchanger tubes and conduit pipe 143 maintains the liquid in the heat exchanger tubes in a non-vaporous condition, in accordance with conventional forced circulation evaporation techniques, so that the heated fluid entering the evaporator chamber through evaporator inlet 144 will immediately flash, producing equilibrium amounts of the HF, $SiF_4$ and water vapor in the vapor phase.

The vapor in the evaporating chamber 131 is then transmitted to the scrubbing tower through the conduit 133, which, in accordance with the present invention, is equipped with pressure reducing means 145. As noted previously, this pressure reducing means can be in the form of a throttle valve, orifice or other flow restricting device which preferably will produce a pressure drop at least equal to one-half inch of mercury. The vapors from the evaporating chamber 145 are discharged into scrubbing tower 132 through inlet 146 positioned adjacent the bottom thereof. Overhead spraying nozzles 147 discharge the recycled scrubbing liquor onto the vapors as they rise through the tower 132 and are exited therefrom via conduit 148 which is connected to a barometric condenser or like vapor condensing means.

The recycle system for the scrubbing liquor includes a sump 149 from which the liquid constituent thereof is pumped by means of a recycle circulating pump 151. In a single stage operation, makeup water could be introduced upstream from the circulating pump 151 as generally designated by the reference numeral 152. Similarly, in a multi-stage operation of the type described above, the sump from the previous stage containing fluosilicic acid rich in HF overflows to this stage as is generally indicated at 153. Circulating pump 151 transmits the scrubbing liquor to the spray nozzles 147 through conduit 154. The scrubbing liquor, after it has absorbed the fluorine compounds, is recycled to the sump through conduit 155 which discharges into return line 156. Vapors exiting from the scrubbing tower are passed through an entrainment separator (not illustrated) wherein the entrained liquor is removed and recycled to the sump, as is schematically shown by the numeral 157.

In the embodiment illustrated in FIGURE 5 wherein the scrubbing tower is mounted atop the evaporating chamber, the operating conditions of the temperature and pressure are generally comparable to those encountered in the embodiment illustrated in FIGURE 4 wherein the scrubbing tower is basically removed from the evaporating chamber.

In some installations, the desired pressure drop can be obtained solely with an entrainment separator having high flow restriction properties. Such an entrainment separator is schematically shown in FIGURES 6 and 7. This entrainment separator generally designated by the reference numeral 161, is mounted on top of the evaporator chamber and is particularly suitable for use on installations wherein the scrubbing tower is mounted directly on top of the evaporating chamber. As is shown, the entrainment separator 161 includes an annular plate 161 having a central opening 163. Entrainment separator 161 is equipped for centrifugal liquid separation by means of an annular chamber 165 defined by an inner circumferential wall 166, inner surface 167a of outer wall 167, annular bottom plate 162 and horizontal top plate 168. Horizontal plate 168 extends in spaced parallel relationship to horizontal plate 162 as is best shown in FIGURE 6. Vapors entering into the inner chamber 169 defined by the bottom surface 168a of horizontal wall 168 and the inner surface wall 166 are directed through an opening 171 formed in inner wall 166 into annular chamber 165. As the vapors pass through annular chamber 166 and are discharged therefrom by means of an overhead opening 172 (positioned opposite inlet 171) into a vapor exiting conduit 173. Conduit 173 is mounted to a domed wall 174 by welding or like bonding technique and is equipped with an overhead cover member 175 which prevents the scrubbing liquor from prematurely contacting the vapors. Cover member 175 is fitted to conduit 173 by means of a plurality of bars 176 mounted to the conduit 173 in supporting relation therewith. As was true in the previously described entrainment separator, the provision of a rubber lining substantially reduces corrosive and erosive wear to the inner walls.

The major design features of a three-stage fluorine recovery system (comparable to that illustrated in FIGURES 1–3) operating in conjunction with an evaporator system designed to produce 550 tons per day $P_2O_5$ when concentrating from 30% $P_2O_5$ to 54% $P_2O_5$ are as follows:

The fluorine recovery or scrubbing tower would be 12′ 6″ diameter by 22′ 0″ in length excluding the entrainment separator section. The estimated total evolution of F (as $SiF_4$ and HF) from the three-stage evaporator would be approximately 2295 lbs./hr. The quantity of fluorine leaving the recovery system with the vapors in a conventional system would be 260 lbs./hr. when producing 15% $H_2SiF_6$, 1080 lbs./hr. when producing 25% $H_2SiF_6$ and 1841 lbs./hr. when producing 30% $H_2SiF_6$. If this invention is applied and the pressure in the first and second stages is reduced 1.5 to 3.5″ Hg absolute the losses of F will be reduced to 180 lbs./hr. when producing 15% $H_2SiF_6$, 360 lbs./hr. when producing 25% $H_2SiF_6$ and 915 lbs./hr. when producing 30% $H_2SiF_6$.

While in the foregoing specification, for purposes of illustrating specific embodiments, many details have been set forth, it will be apparent to those skilled in the art that many of these details can be varied without departing from the spirit of this invention. Accordingly, the present invention is to be limited only by the scope of the appended claims.

We claim:

1. The method of recovering fluorine compounds which include HF and $SiF_4$ from vapors produced during the concentrating of aqueous phosphoric acid by evaporation, said method comprising evaporating an aqueous phosphoric acid solution containing fluorine compounds in an evaporator mantained at a given pressure and producing a vapor phase in said evaporator containing water vapor and fluorine compounds, transmitting said vapor phase through interconnecting means to a scrubbing tower, reducing the pressure of said vapor phase in said interconnecting means and scrubbing said vapor phase at a pressure lower than said given pressure, the differential pressure between said evaporator and scrubbing tower being equal to at least one-half inch of mercury.

2. The method of claim 1 wherein said differential pressure is at least two inches of mercury.

3. The method of claim 1 wherein said vapor phase is scrubbed with a dilute aqueous fluosilicic acid solution.

4. The method of claim 3 wherein said evaporator is maintained under vacuum conditions at a given absolute pressure of from one to thirteen inches of mercury, said fluorine compounds include HF and $SiF_4$, and said vapor phase is scrubbed with an aqueous fluosilicic acid solution containing from 15% to 38% $H_2SiF_6$.

5. The method of claim 4 wherein said differential pressure is at least two inches of mercury.

6. The method of claim 4 wherein said scrubbing tower operates at an absolute pressure of between 1 and 10 inches of mercury.

7. The method of claim 6 wherein said evaporator is a forced circulation evaporator.

8. In an apparatus for recovery of a desired compound from a vapor phase by scrubbing, said apparatus including an evaporator, a scrubbing tower and means interconnecting said evaporator and scrubbing tower, the improvement comprising means including pressure reducing means located in said interconnecting means for lowering the absolute pressure in said scrubbing tower so that the differential operating pressure between said scrubbing tower and evaporator is at least equal to one-half inch of mercury.

9. The improvement of claim 8 wherein said pressure reducing means is sized to produce a differential operating pressure of at least two inches of mercury.

10. The apparatus of claim 8 wherein vacuum means communicates with said evaporator for operating said evaporator at subatmospheric pressures.

11. The apparatus of claim 10 wherein said pressure reducing means in said interconnecting means for lowering the absolute pressure in said scrubbing tower comprises an entrainment separator.

12. The apparatus of claim 10 wherein said pressure reducing means in said interconnecting means for lowering the absolute pressure in said scrubbing tower comprises a throttle valve.

13. The apparatus of claim 10 wherein said pressure reducing means in said interconnecting means for lowering the absolute pressure in said scrubbing tower comprises an orifice.

References Cited

UNITED STATES PATENTS

| | | | |
|---|---|---|---|
| 2,447,834 | 8/1948 | Balcan | 55—71 |
| 3,091,513 | 5/1963 | Parish | 23—153 |
| 3,273,713 | 9/1966 | Parish | 23—153 |
| 3,275,062 | 9/1966 | Williams | 159—4 |
| 3,286,442 | 11/1966 | Wylegala | 55—71 |

FOREIGN PATENTS 617,506 4/1961 Canada.

SAMIH N. ZAHARNA, *Primary Examiner.*

C. N. HART, *Assistant Examiner.*

U.S. Cl. X.R.

55—71, 189, 84, 258; 23—153